US011762713B2

(12) United States Patent
Sakae et al.

(10) Patent No.: US 11,762,713 B2
(45) Date of Patent: Sep. 19, 2023

(54) INFORMATION PROCESSING APPARATUS, CONTROL METHOD, AND PROGRAM (71) Applicant: NEC Corporation, Tokyo (JP)

(72) Inventors: Yoshiaki Sakae, Tokyo (JP); Kazuhiko Isoyama, Tokyo (JP); Jun Nishioka, Tokyo (JP); Etsuko Ichihara, Tokyo (JP)

(73) Assignee: NEC CORPORATION, Tokyo (JP)

(*) Notice: Subject to any disclaimer, the term of this patent is extended or adjusted under 35 U.S.C. 154(b) by 171 days.

(21) Appl. No.: 17/278,371

(22) PCT Filed: Sep. 28, 2018

(86) PCT No.: PCT/JP2018/036444
§ 371 (c)(1),
(2) Date: Mar. 22, 2021

(87) PCT Pub. No.: WO2020/065960
PCT Pub. Date: Apr. 2, 2020

(65) Prior Publication Data
US 2021/0357274 A1 Nov. 18, 2021

(51) Int. Cl.
G06F 9/54 (2006.01)
(52) U.S. Cl.
CPC .................. G06F 9/542 (2013.01)
(58) Field of Classification Search
CPC .................. G06F 9/542; G06F 16/1734

USPC ........................................... 719/318
See application file for complete search history.

(56) References Cited

U.S. PATENT DOCUMENTS 10,764,149 B2* 9/2020 Keppler ................. H04L 41/16
10,942,937 B2* 3/2021 Pant ..................... G06F 11/3476
11,043,298 B2* 6/2021 Opitz ..................... G06N 5/025

FOREIGN PATENT DOCUMENTS

| JP | 2013-065244 A | 4/2013 |
| JP | 2014-146074 A | 8/2014 |
| JP | 2015-079817 A | 4/2015 |
| WO | 2017/141589 A1 | 8/2017 |

OTHER PUBLICATIONS

International Search Report for PCT Application No. PCT/JP2018/036444, dated Dec. 25, 2018.

* cited by examiner

Primary Examiner — Andy Ho (57) ABSTRACT

A first information processing apparatus (2000) determines an alternative representation (20) of an event sequence represented by a plurality of event histories (12), by use of dictionary data (30). The first information processing apparatus (2000) outputs information including the determined alternative representation (20). The dictionary data (30) indicate an event sequence and an alternative representation (20) relating to the event sequence in association with each other.

11 Claims, 8 Drawing Sheets

| SUBJECT INFORMATION ||| OBJECT INFORMATION || SPECIFICS INFORMATION | TIME OF OCCURRENCE |
|---|---|---|---|---|---|---|
| PROCESS ID | THREAD ID | PATH | TYPE | IDENTIFICATION INFORMATION | | |
| 010 | 001 | C¥dir11/a1.exe | PROCESS | D¥dir21/dir22/a2.exe | START | 2018/1/10 10:05:24 |
| 010 | 002 | C¥dir11/a1.exe | FILE | D¥dir23/b2.conf | WRITE | 2018/1/10 10:06:02 |
| 013 | — | C¥dir15/b1.exe | SOCKET | socket1 | READ | 2018/1/11 9:06:02 |
| ... | ... | ... | ... | ... | ... | ... |

| SECOND EVENT SEQUENCE | ALTERNATIVE REPRESENTATION | |
|---|---|---|
| | API IDENTIFICATION INFORMATION | EXECUTION CONDITION |
| READ FILE A | API 1 | ARGUMENT a > 0 |
| READ FILE B | | |
| WRITE TO FILE C | | |
| READ FILE A | API 1 | ARGUMENT a <= 0 |
| READ FILE D | | |
| WRITE TO FILE E | API 2 | ENVIRONMENTAL VARIABLE d = "mode 1" |
| WRITE TO FILE F | | |
| ... | ... | ... |

FIG. 8

| TIME OF OCCURRENCE | ALTERNATIVE REPRESENTATION |
|---|---|
| t1 | API: hoo; ARGUMENT: a>0 |
| t2 | API: bar; ARGUMENT: b=0, c<0; ENVIRONMENTAL VARIABLE: d = "mode 1" |
| ... | ... |

INFORMATION PROCESSING APPARATUS, CONTROL METHOD, AND PROGRAM

This application is a National Stage Entry of PCT/JP2018/036444 filed on Sep. 28, 2018, the contents of all of which are incorporated herein by reference, in their entirety.

TECHNICAL FIELD

The present invention relates to management of histories.

BACKGROUND ART

Development of technologies of managing histories of various events is in progress. For example, PTL 1 discloses a technology of managing logs of events to be investigated with a circular buffer. Since a circular buffer is used, when a log is written on the tail end of the buffer, the operation returns to the beginning of the buffer and the log writing is continued by overwriting existing logs. However, an area where an event with a predetermined ID is stored is not overwritten.

PTL 2 discloses a technology of extracting an error log and a log related to the error log from a log file and deleting logs other than the extracted logs from the log file when an amount of log data is equal to or greater than a threshold value. A log related to an error log is a log recorded within n seconds before or after the error log or any of n pieces of logs recorded before or after the error log.

CITATION LIST

Patent Literature

[PTL 1] Japanese Patent Application Publication No. 2014-146074
[PTL 2] Japanese Patent Application Publication No. 2013-065244

SUMMARY OF INVENTION

Technical Problem

By using the technologies in PTL 1 and PTL 2, information about events other than a specific event can be deleted from a log. However, in these technologies, the information about the specific event remains intact in the log. Therefore, for example, when many specific events set to be kept in the log occur, the size of the log increases.

The present invention has been made in view of the aforementioned problem, and an object thereof is to provide a technology of efficiently managing event histories.

Solution to Problem

An information processing apparatus according to the present invention includes: 1) a determination unit determining an alternative representation of an event sequence represented by a plurality of event histories, by use of dictionary data; and 2) an output unit outputting information including the determined alternative representation. The dictionary data indicate an event sequence and an alternative representation relating to the event sequence in association with each other.

A control method according to the present invention is executed by a computer. The control method includes: 1) a determination step of determining an alternative representation of an event sequence represented by a plurality of event histories, by use of dictionary data; and 2) an output step of outputting information including the determined alternative representation. The dictionary data indicate an event sequence and an alternative representation relating to the event sequence in association with each other.

A program according to the present invention causes a computer to execute each step included in the control method according to the present invention.

Advantageous Effects of Invention

The present invention provides a technology of efficiently managing event histories.

BRIEF DESCRIPTION OF DRAWINGS

The aforementioned object, other objects, features and advantages will become more apparent by the following preferred example embodiments and accompanying drawings.

EXAMPLE EMBODIMENT

Example embodiments of the present invention will be described below by use of drawings. In every drawing, similar components are given similar signs, and description thereof will not be repeated as appropriate. Further, unless specifically described, each block in each block diagram represents a function-based configuration rather than a hardware-based configuration.

Example Embodiment 1

<Outline>

Figure 1:
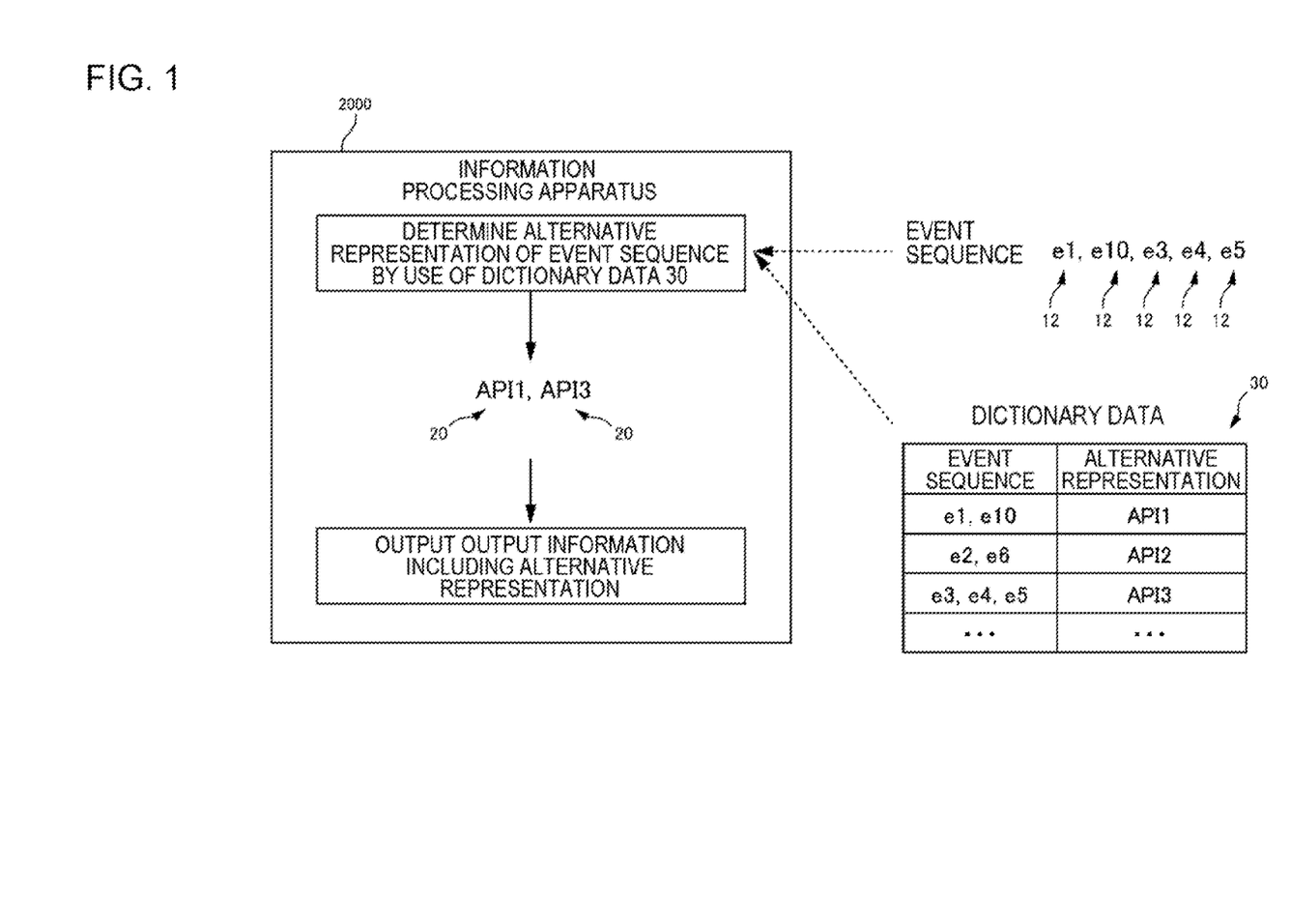
FIG. 1 is a diagram illustrating an outline of an operation of an information processing apparatus according to an example embodiment 1.

FIG. 1 is a diagram illustrating an outline of an operation of an information processing apparatus according to an example embodiment 1. FIG. 1 is a conceptual diagram for ease of understanding of an operation of an information processing apparatus 2000 and does not specifically limit the operation of the information processing apparatus 2000.

The information processing apparatus 2000 expresses an event sequence represented by a plurality of event histories 12 by a briefer alternative representation 20. An event history 12 is information about an event occurring in a target computer system (hereinafter referred to as a target system). A target system is configured with one or more of any machines. The machine may be a physical machine or a virtual machine. For example, an event represents an activity (such as access to a file or another process) performed by a process operating on a machine included in a target system.

An alternative representation 20 is information representing an event sequence in another form. For example, an alternative representation 20 represents a meaning of an event sequence, a name of a series of processing operations provided by the event sequence, or the like. For example, it is assumed in a target system configured to record activities of processes in event histories 12 on a per system call basis that an application programming interface (API) X accompanied by execution of a plurality of system calls is executed. In this case, an event history 12 for each of the plurality of system calls executed in the API X is recorded. Therefore, an event sequence (a sequence of a plurality of system calls) represented by the event histories 12 has a definite meaning, that is, execution of the API X. Therefore, in this case, the event sequence represented by the plurality of event histories 12 may be briefly represented by an alternative representation 20 such as "execution of the API X."

Then, the information processing apparatus 2000 determines an alternative representation 20 for an event sequence represented by a plurality of event histories 12. Determination of an alternative representation 20 is performed by use of dictionary data 30. The dictionary data 30 are information associating an event sequence with an alternative representation 20 relating to the event sequence. Furthermore, the information processing apparatus 2000 outputs output information including the determined alternative representation 20.

For example, the information processing apparatus 2000 acquires an event sequence "e1, e10, e3, e4, e5" in an example in FIG. 1. An alternative representation 20 "API 1" is associated with an event sequence "e1, e10" in the dictionary data 30. Further, an alternative representation 20 "API 3" is associated with an event sequence "e3, e4, e5" in the dictionary data 30. Then, out of the acquired event sequence, the information processing apparatus 2000 determines the alternative representation 20 "API 1" for the event sequence "e1, e10" and determines the alternative representation 20 "API 3" for the event sequence "e3, e4, e5." Then, the information processing apparatus 2000 outputs information including the alternative representation 20 "API 1" and the alternative representation 20 "API 3." For example, the information processing apparatus 2000 stores a file sequentially indicating the alternative representations 20 into a storage apparatus.

Advantageous Effect

The information processing apparatus 2000 according to the present example embodiment determines an alternative representation 20 for an event sequence represented by a plurality of event histories 12, by use of the dictionary data 30. Then information including the alternative representation 20 is output. Thus, events occurring in a target system can be managed by managing alternative representations 20 more briefly representing a plurality of event histories 12 in place of the event histories 12. Consequently, computer resources (such as capacity of a storage apparatus) required for management of histories of events occurring in the target system can be reduced, and therefore event histories can be efficiently managed.

Further, managing event histories by use of an alternative representation 20 allows a person to more readily recognize behavior of the target system. For example, it is assumed that a plurality of system calls are executed accompanying execution of an API. In this case, viewing a name or the like of the API calling the system calls allows behavior of the target system to be more readily recognized than viewing a name or the like of each system call.

The information processing apparatus 2000 according to the present example embodiment will be described in more detail below.

Functional Configuration Example of Information Processing Apparatus 2000

Figure 2:
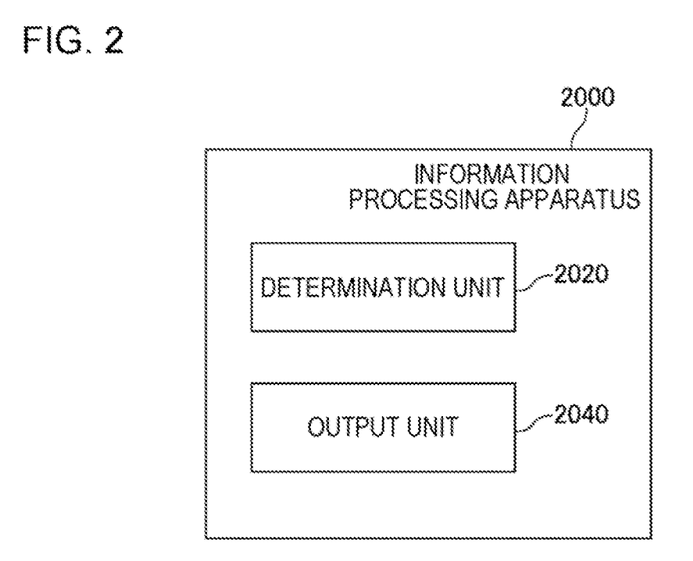
FIG. 2 is a diagram illustrating a configuration of a first information processing apparatus according to the example embodiment 1.

FIG. 2 is a diagram illustrating a configuration of the information processing apparatus 2000 according to the example embodiment 1. The information processing apparatus 2000 includes a determination unit 2020 and an output unit 2040. The determination unit 2020 determines an alternative representation 20 for an event sequence represented by a plurality of event histories 12, by use of the dictionary data 30. The output unit 2040 outputs output information including an alternative representation 20. The dictionary data 30 indicates an association of an event sequence with an alternative representation 20 relating to the event sequence.
<Hardware Configuration of Information Processing Apparatus 2000>

Each functional component in the information processing apparatus 2000 may be provided by hardware (such as a hard-wired electronic circuit) providing the functional component or may be provided by a combination of hardware and software (such as a combination of an electronic circuit and a program controlling the circuit). A case of a combination of hardware and software providing each functional component of the information processing apparatus 2000 will be further described below.

Figure 3:
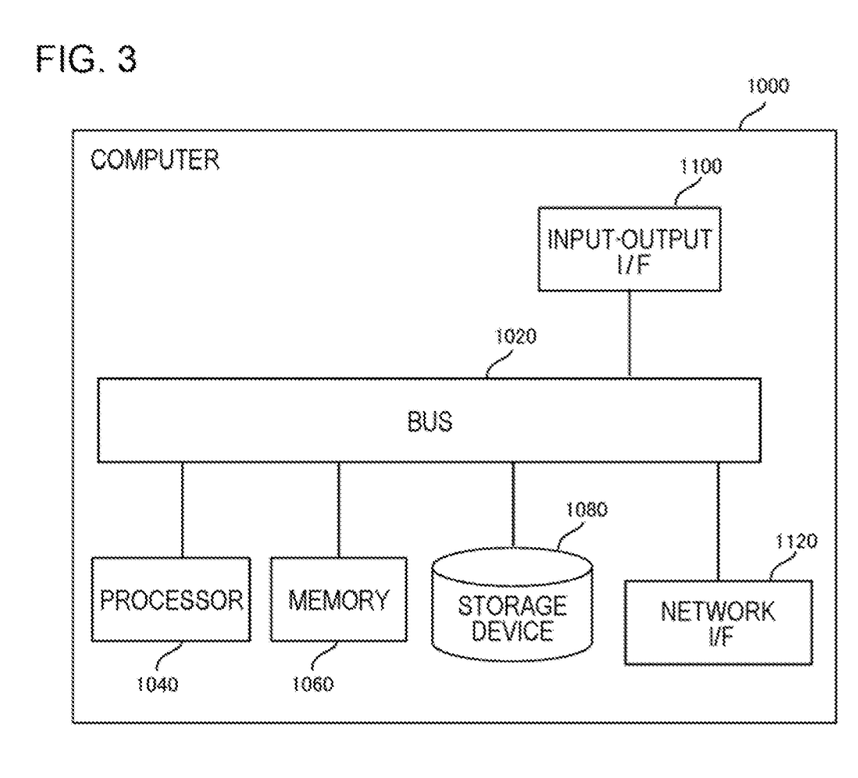
FIG. 3 is a diagram illustrating a computer for providing the first information processing apparatus.

FIG. 3 is a diagram illustrating a computer 1000 for providing the information processing apparatus 2000. The computer 1000 is any computer. For example, the computer 1000 is a stationary computer such as a personal computer (PC) or a server machine. In addition, for example, the computer 1000 is a portable computer such as a smartphone or a tablet terminal. The computer 1000 may be a dedicated computer designed for providing the information processing apparatus 2000 or may be a general-purpose computer.

The computer 1000 includes a bus 1020, a processor 1040, a memory 1060, a storage device 1080, an input-output interface 1100, and a network interface 1120. The bus 1020 is a data transmission channel for the processor 1040, the memory 1060, the storage device 1080, the input-output interface 1100, and the network interface 1120 to mutually transmit and receive data. However, a method of connecting the processor 1040 and the like to each other is not limited to bus connection.

The processor 1040 includes various processors such as a central processing unit (CPU), a graphics processing unit (GPU), and a field-programmable gate array (FPGA). The memory 1060 is a main storage apparatus provided by use of a random access memory (RAM) or the like. The storage device 1080 is an auxiliary storage apparatus provided by use of a hard disk, a solid state drive (SSD), a memory card, a read only memory (ROM), or the like.

The input-output interface 1100 is an interface for connecting the computer 1000 to an input-output device. For example, the input-output interface 1100 is connected to an input apparatus such as a keyboard and an output apparatus such as a display apparatus.

The network interface 1120 is an interface for connecting the computer 1000 to a communication network. For example, the communication network is a local area network (LAN) or a wide area network (WAN). A method of connecting the network interface 1120 to a communication network may be wireless connection or wired connection.

The storage device 1080 stores a program module providing each functional component in the information processing apparatus 2000. The processor 1040 provides a function relating to each program module by reading the program module into the memory 1060 and executing the program module.

<Processing Flow>

Figure 4:
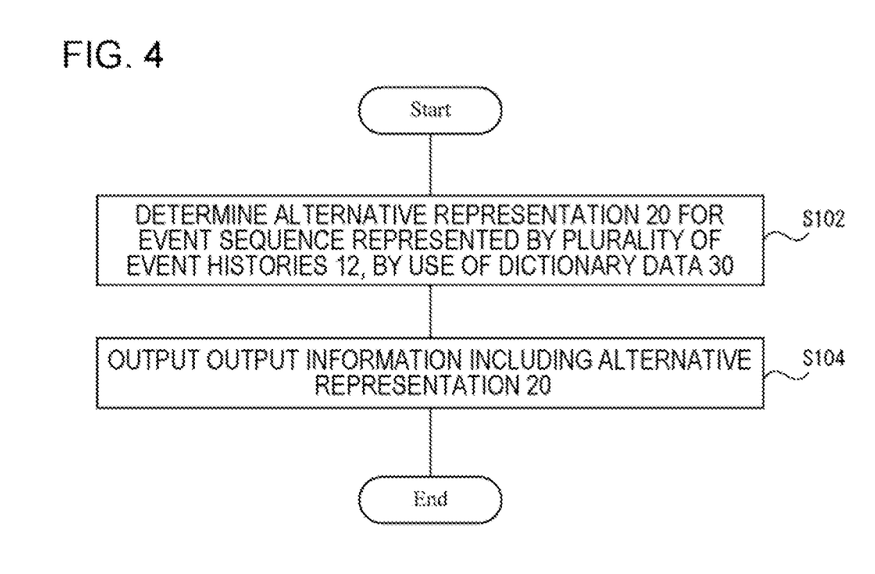
FIG. 4 is a flowchart illustrating a flow of processing executed by the first information processing apparatus according to the example embodiment 1.

FIG. 4 is a flowchart illustrating a flow of processing executed by the information processing apparatus 2000 according to the example embodiment 1. The determination unit 2020 determines an alternative representation 20 for an event sequence represented by a plurality of event histories 12, by use of the dictionary data 30 (S102). The output unit 2040 outputs output information including the alternative representation 20 (S104).

<Event History 12>

An event history 12 is information about an event occurring on a target system (on a machine included in the target system) at a certain point in the past. An event history 12 indicates a time of occurrence of an event and specifics of the event in association with each other.

For example, an event history 12 represents an activity history of a process operating on the computer system 10. For example, activities of processes are recorded on a per system call basis. When a certain process functions with another process as an object, the processes may operate on operating systems (OSs) identical to each other or may operate on OSs different from each other. Conceivable examples of the latter include a certain process communicating with another process operating on another OS by using a socket interface.

For example, an event is identified by information representing four factors being a subject, an object, activity specifics, and a time of occurrence. Then, for example, an event history 12 indicates a combination of subject information representing a subject, object information representing an object, specifics information representing specifics of an activity, and a time of occurrence.

For example, subject information is information for identifying a process causing an event to occur. The information for identifying the process is hereinafter referred to as process identification information. Specifically, process identification information includes a process identifier (ID). However, process identification information about a process in which a plurality of threads operate further includes thread IDs in addition to a process ID.

Process identification information may further include information about an executable file of a process. For example, information about an executable file of a process includes a name and a path of the executable file, a hash value of the executable file, a digital signature of the executable file, or a name of an application provided by the executable file.

For example, object information is a type and identification information of the object. For example, a type of an object is a process, a file, or a socket. When an object is a process, the object information includes process identification information of the process.

When an object is a file, the object information includes information for identifying the file (hereinafter referred to as file identification information). For example, file identification information includes a name and a path of the file. Further, when an object is a file, the object information may include a hash value of the file, and/or a combination of an identifier of a file system and an identifier of a disk block constituting the file on the file system (such as an inode number or an object ID).

For example, when an object is a socket, the object information includes an identifier assigned to the socket.

For example, specifics information is an identifier previously assigned to specifics of each of various activities. For example, specifics of activities such as "starting a process," "stopping a process," "opening a file," "reading data from a file," "writing data into a file," "opening a socket," "reading data from a socket," and "writing data into a socket" are assigned with identifiers different from one another. Access to a socket means access to another apparatus associated with the socket.

When events are recorded on a per system call basis, specifics information may indicate identification information of a system call. For example, identification information of a system call is a system call name or a system call number. Specifics information may further indicate information representing a condition under which a system call is executed, such as specifics of an argument given to the system call (a value of the argument itself or data stored in a memory area indicated by a pointer given as the argument).

Figure 5:
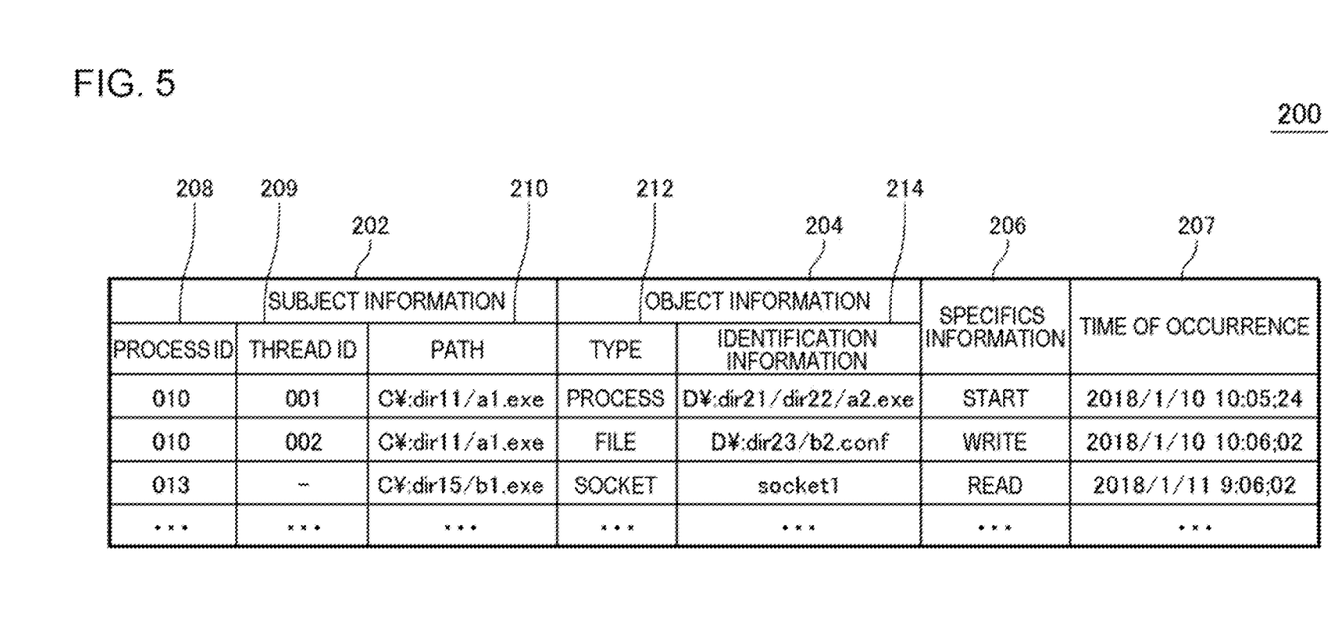
FIG. 5 is a diagram illustrating event histories in a table format.

FIG. 5 is a diagram illustrating event histories 12 in a table format. The table in FIG. 5 is hereinafter referred to as table 200. Each record in table 200 represents one event history 12. Table 200 includes subject information 202, object information 204, specifics information 206, and a time of occurrence 207. The subject information 202 includes a process ID 208, a thread ID 209, and a path 210. The object information 204 includes a type 212 and identification information 214. The time of occurrence 207 indicates a time of occurrence of an event.

An event history 12 is generated by recording an activity of a process on a target system. An existing technology may be used as a technology of recording an activity of a process.

<Acquisition of Event History 12>

The determination unit 2020 acquires a plurality of event histories 12 being processing targets. Specifically, the determination unit 2020 acquires an event history sequence 10 in which event histories 12 are arranged on a time-series basis. The event history sequence 10 is stored in a storage apparatus accessible from the determination unit 2020. The storage apparatus is referred to as a history storage apparatus. The history storage apparatus may be provided inside the information processing apparatus 2000 or may be provided outside the information processing apparatus 2000.

For example, the history storage apparatus stores a log file. For example, a plurality of event histories 12 are recorded in ascending order of time of occurrence in the log file. The determination unit 2020 acquires an event history sequence 10 by sequentially reading information recorded in the log file.

<<Event Rectification>>

An event history sequence 10 may include histories of events caused by operations of various operation subjects. In such a case, the information processing apparatus 2000 groups event histories 12 included in an event history sequence 10 by operation subject. The grouping is also referred to as "event rectification."

Figure 6:
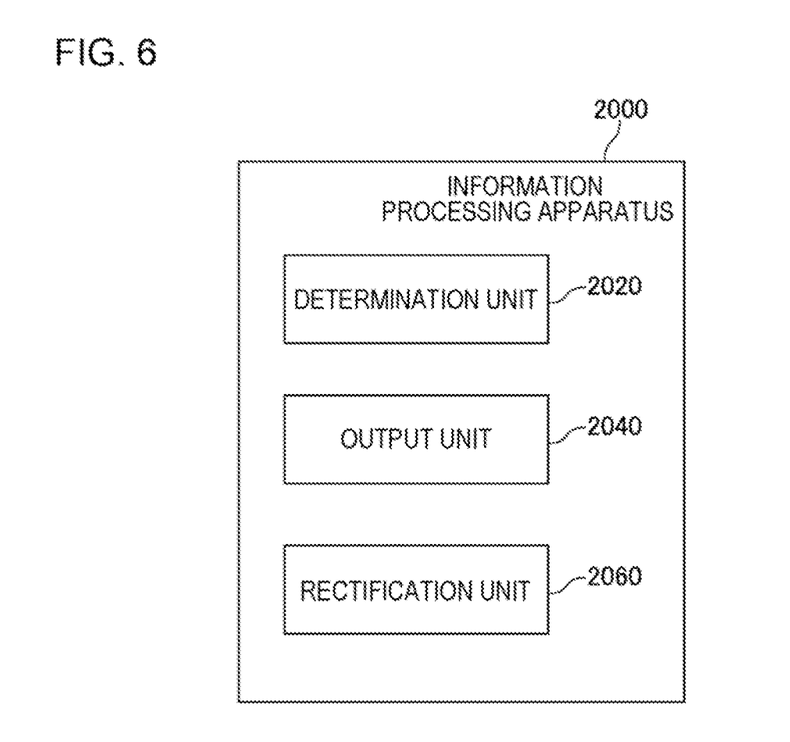
FIG. 6 is a block diagram illustrating a first information processing apparatus including a rectification unit.

A functional component having a function of event rectification is referred to as a rectification unit 2060. FIG. 6 is a block diagram illustrating an information processing apparatus 2000 including the rectification unit 2060. The rectification unit 2060 divides event histories 12 included in an event history sequence 10 into groups each consisting of event histories 12 of the same operation subject. An operation subject can be determined by a process ID included in subject information of an event history 12. However, when an operation subject is a thread, an operation subject is determined by a pair of "a process ID and a thread ID."

Event rectification may be performed by an apparatus other than the information processing apparatus 2000. In this case, the determination unit 2020 acquires an event history sequence 10 for each group.

<Determination of Alternative Representation 20: S102>

The determination unit 2020 determines an alternative representation 20 for an event sequence represented by a plurality of event histories 12, by use of the dictionary data 30 (S102). Specifically, the determination unit 2020 acquires an event history sequence 10 and determines one or more alternative representations 20 for an event sequence (hereinafter referred to as a first event sequence 14) represented by a plurality of event histories 12 included in the acquired event history sequence 10.

<<Dictionary Data 30>>

The dictionary data 30 are used for determination of an alternative representation 20. The dictionary data 30 will be specifically described. The dictionary data 30 are data associating an event sequence with an alternative representation 20 relating to the event sequence. An event sequence indicated in the dictionary data 30 is referred to as a second event sequence.

Figure 7:
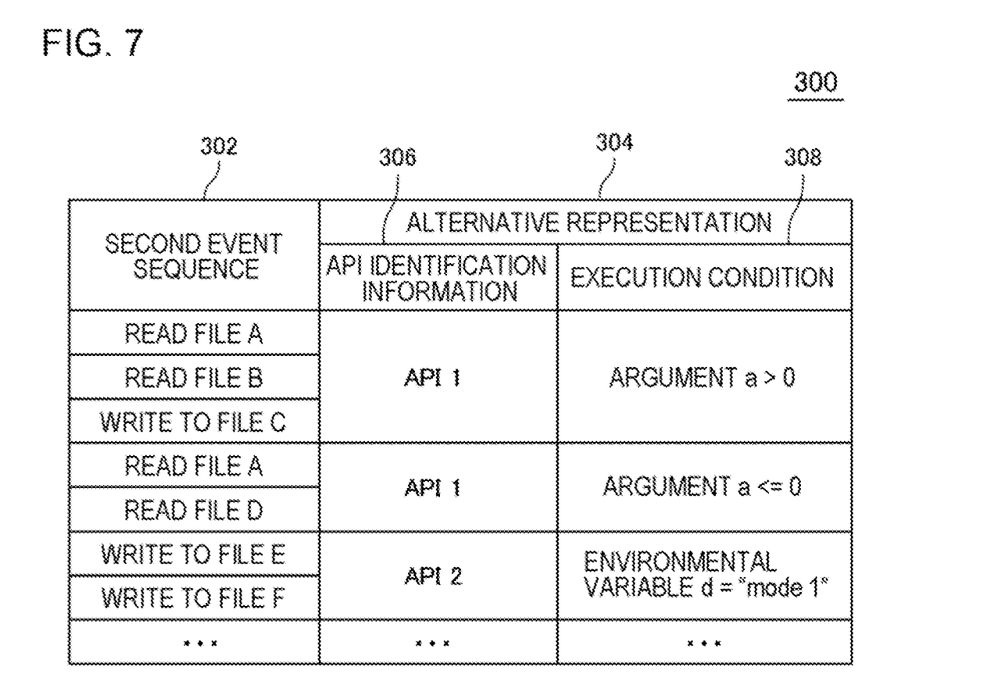
FIG. 7 is a diagram illustrating dictionary data in a table format.

FIG. 7 is a diagram illustrating the dictionary data 30 in a table format. The table illustrated in FIG. 7 is denoted as table 300. Table 300 includes two columns being a second event sequence 302 and an alternative representation 304. The second event sequence 302 is data in which pieces of information representing events are arranged on a time-series basis. The alternative representation 304 is an alternative representation 20 associated with a second event sequence indicated in the second event sequence 302.

For example, each event included in the second event sequence 302 is determined by a combination of an object and specifics of an activity of a process (what is performed on what). For example, "reading a file A" is an activity of a process having "the file A" as an object and "reading a file" as specifics. Then, for example, information of each event indicated by a second event sequence 302 may be set as a combination of object information and specifics information in an event history 12 (object information 204 and specifics information 206 in table 200 in FIG. 5).

For example, an alternative representation 20 indicated by the dictionary data 30 represents a meaning of a relating second event sequence or a name of processing provided by the relating second event sequence. For example, in a case of indicating a sequence of events accompanying execution of a certain API as a second event sequence, a relating alternative representation 20 represents identification information (such as a name) of the API. When a plurality of versions of APIs with the same name exist and occurring event sequences vary with version, it is suitable to also include version information in identification information of the API.

Further, for some API, executed processing may vary with execution condition of the API (such as specifics of an argument given to the API and/or an environmental variable). In such a case, it is suitable to also include information representing an execution condition in an alternative representation 20 in addition to identification information of the API. For example, in table 300 in FIG. 7, the alternative representation 304 indicates an execution condition 308 in addition to API identification information 306.

Information indicated by an alternative representation 20 may be text data recognizable to human eyes in consideration that the information is output as information viewed by human eyes. For example, it is assumed that there is an API called hoo. It is further assumed that events A and B occur when hoo is executed with a value of an argument a being 0 or greater, and events C and D occur when hoo is executed with the value of the argument a being less than 0. In this case, an alternative representation 20 associated with a second event sequence "A, B" is set to text data "API: hoo; argument: a>=0," and an alternative representation 20 associated with a second event sequence "C, D" is set to text data "API: hoo; argument: a<0." By output of such text data, a person can readily recognize "which API is executed under what execution condition."

What the dictionary data 30 indicate is not limited to an association of an event sequence with an API. For example, without being limited to an API, the dictionary data 30 may associate any function with a sequence of events caused by execution of the function. It is assumed herein that a function means a processing group defined as an aggregation of a series of processing operations and also includes a procedure or a method. Further, an event sequence does not need to be associated with a function only.

<<Determination Method of Alternative Representation 20>>

For example, the determination unit 2020 extracts one or more partial event sequences matching any second event sequence from a first event sequence 14. Then, the information processing apparatus 2000 determines an alternative representation 20 for each of the extracted partial event sequences. Specifically, the determination unit 2020 determines an alternative representation 20 relating to a second event sequence matching a partial event sequence as an alternative representation 20 for the partial event sequence.

Matching of a first event sequence and a second event sequence will be more specifically described. For example, the determination unit 2020 computes a similarity level of each second event sequence indicated in the dictionary data 30 with a partial event sequence starting from the beginning of a first event sequence. For example, a second event sequence with a length of n is compared with a partial event sequence with a length of n starting from the beginning of a first event sequence. The determination unit 2020 handles a pair of a partial event sequence and a second event sequence for which a similarity level equal to or greater than a threshold value is computed as a matched pair.

When a certain partial event sequence matches a second event sequence, the determination unit 2020 extracts the partial event sequence from the first event sequence 14. Then, the determination unit 2020 determines an alternative representation 20 relating to (associated in the dictionary data 30 with) the second event sequence matching the extracted partial event sequence as an alternative representation 20 for the partial event sequence. The determination unit 2020 further performs similar processing repeatedly on the first event sequence 14 excluding the extracted partial event sequence. The repetition of the processing is performed until the first event sequence 14 no longer exists.

It is assumed that a partial event sequence starting from the beginning of the first event sequence 14 does not match any second event sequence. In this case, for example, the determination unit 2020 further performs matching of the first event sequence 14 and a second event sequence after excluding the event history 12 at the beginning from the first event sequence 14.

It is further assumed that a plurality of second event sequences each of which having a similarity level with a partial event sequence starting from the beginning of the first event sequence 14 equal to or greater than a threshold value exist. In this case, for example, the determination unit 2020 extracts the longest partial event sequence out of the partial event sequences a similarity level of each of which is computed to be equal to or greater than the threshold value from the first event sequence 14. Then, the determination unit 2020 determines an alternative representation 20 relating to a second event sequence matching the partial event sequence as an alternative representation 20 for the partial event sequence.

For example, it is assumed that a partial event sequence A1 with a length of 2 starting from the beginning of a first event sequence 14 matches a second event sequence B1, and a partial event sequence A2 with a length of 4 starting from the beginning of the first event sequence 14 matches a second event sequence B2. In this case, the determination unit 2020 extracts the partial event sequence A2 with a length of 4 from the first event sequence 14 and determines an alternative representation 20 for the partial event sequence A2 as an alternative representation 20 associated with the second event sequence B2 in the dictionary data 30.

<<Similarity Level>>

A method of determining a similarity level between event sequences will be described. With respect to a plurality of events indicated by a partial event sequence and events indicated by a second event sequence, the determination unit 2020 computes a similarity level between events of a rank identical to each other from the beginning. Specifically, the determination unit 2020 performs processing of "computing a similarity level between the n-th event of the second event sequence and the n-th event of the partial event sequence (the n-th event from the beginning of the first event sequence 14)" on every event included in the second event sequence. Then, by use of a plurality of computed similarity levels, the determination unit 2020 computes a similarity level between the second event sequence and the partial event sequence. For example, the determination unit 2020 computes a totaled value, a multiplied value, an averaged value, or the like of the plurality of computed similarity levels as a similarity level between the second event sequence and the partial event sequence.

For example, a similarity level between events is computed based on a degree of similarity of an object and activity specifics of an activity of a process represented by the event. For example, the determination unit 2020 computes a similarity level between an object and specifics of the i-th event of a partial event sequence (object information and specifics information indicated by the i-th event history 12), and an object and activity specifics of the i-th event of a second event sequence. For example, the determination unit 2020 computes a total value, a multiplied value, or an average value of similarity levels between objects and similarity levels between activity specifics and determines the computed value to be a similarity level between the events.

As a more specific example, it is assumed that an activity of a process is recorded on a per function (such as a system call) basis. In this case, an object and specifics of an activity of a process indicated by an event history 12 is determined by identification information of a function and an execution condition of the function (such as specifics of an argument). Then, both an event history 12 and a second event sequence are set to include identification information of a function and an execution condition thereof as information representing the event. Then, the determination unit 2020 computes a similarity level between identification information and an execution condition of each function indicated by the partial event sequence, and identification information and an execution condition of each function indicated by the second event sequence.

For example, a similarity level is determined as a value equal to or greater than 0 and equal to or less than 1. Then, a similarity level is set to 1 when every piece of identification information and every execution condition of a function match between events to be compared. Then, a similarity level is set in such a way as to decrease as an amount of information matching between events decreases. However, it is suitable to give a larger weight to match-mismatch of identification information of a function than that for match-mismatch of an execution condition. The reason is that specifics of processing greatly vary with function whereas specifics of processing do not vary so much due to some variation in an execution condition such as an argument.

For example, 0.5 out of a maximum value 1 of a similarity level between events is determined by match-mismatch of identification information of a function. In other words, the value of a similarity level is set to 0.5 when identification information of functions match. Then, a value obtained by adding, to a value of the similarity level, a degree of matching (a value between 0 and 0.5) of an execution condition is set as a similarity level between the events.

<<Case of Existence of a Plurality of Operation Subjects>>

As described above, an event history sequence 10 may include event histories 12 of operation subjects different from each other. In this case, the determination unit 2020 divides the event history sequence 10 into aforementioned groups, acquires a first event sequence 14 for each group, and determines an alternative representation 20 for each first event sequence 14.

<Output of Output Information: S106>

The output unit 2040 outputs information including an alternative representation 20 (S106). For example, the output unit 2040 generates a second event history sequence from a first event sequence 14 and outputs the second event history sequence. A second event history sequence indicates second event histories on a time-series basis. One second event history indicates an alternative representation 20 determined for one partial event sequence extracted from a first event sequence 14. In other words, a second event history sequence is acquired by replacing event histories 12 included in a first event sequence 14 with second event histories.

Figure 8:
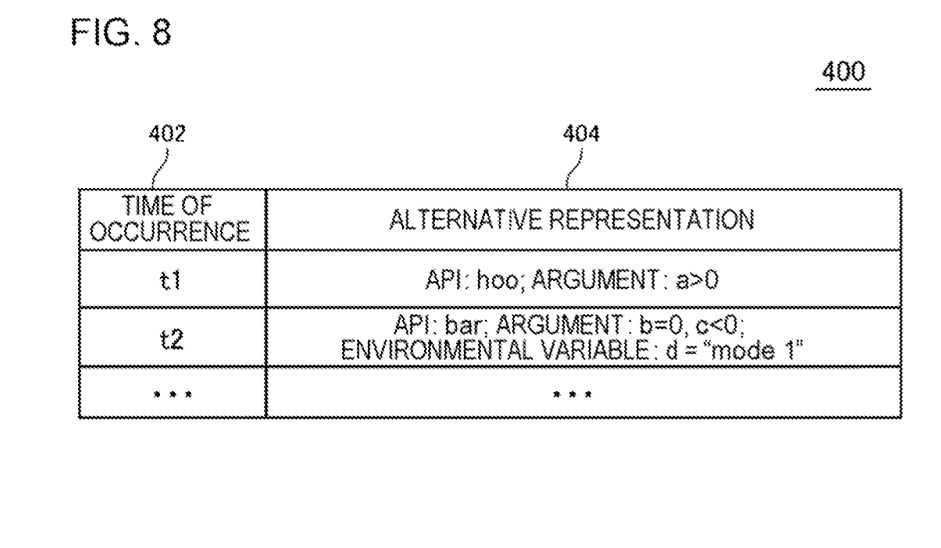
FIG. 8 is a diagram illustrating a second event history sequence in a table format.

FIG. 8 is a diagram illustrating a second event history sequence in a table format. The table in FIG. 8 is referred to as table 400. Table 400 includes two columns being a time of occurrence 402 and an alternative representation 404.

It can be said that a second event history is an aggregate of a plurality of event histories 12. Therefore, computer resources (such as capacity of a storage apparatus) required for managing histories of events occurring in a target system can be reduced by managing the histories of the events occurring in the target system by use of second event histories in place of event histories 12.

Further, behavior of a target system can be more readily recognized by a person by managing histories of events by use of second event histories. For example, it is assumed that a plurality of system calls are executed accompanying execution of an API. In this case, behavior of a target system can be more readily recognized by viewing a name or the like of the API calling the system calls than by viewing a name or the like of each system call.

For example, an output destination of a second event history is a storage apparatus. For example, the output unit 2040 generates a log file in which a second event history is recorded for each first event sequence 14 (for each operation subject). Specifically, the output unit 2040 records one or more second event histories generated from one first event sequence 14 into a log file in order of time of occurrence and causes a storage apparatus to store the log file. However, an output destination of a second event history may be a display apparatus or another apparatus (such as a server machine).

<Generation Method of Dictionary Data 30>

The dictionary data 30 are previously generated and are stored in a storage apparatus. A method of generating the dictionary data 30 will be illustrated. Generation of the dictionary data 30 may be performed by the information processing apparatus 2000 or may be performed by an apparatus other than the information processing apparatus 2000. An apparatus performing generation of the dictionary data 30 is hereinafter referred to as a second information processing apparatus 3000.

The second information processing apparatus 3000 generates the dictionary data 30 by analyzing a record of behavior of a test system. The test system is configured to cause a storage apparatus to store event histories 12, similarly to a target system.

Further, with respect to a series of events to be represented by use of an alternative representation 20, the test system causes the storage apparatus to store information representing the start point of the events (hereinafter referred to as start information) and information representing the end point of the events (hereinafter referred to as end information). For example, start information and end information are recorded in a log file along with event histories 12.

For example, it is assumed that execution of a series of system calls caused by execution of an API is to be handled as a series of events. In this case, for example, the test system hooks an API call and records start information indicating information about the API (identification information and an execution condition) before execution of the API. The test system further records end information after the execution of the API in such a mode that a correspondence with the start information is recognized. For example, a correspondence between start information and end information can be recognized by including the same identification information (such as a random value) in the start information and the end information.

An existing technology can be used as a technology of hooking an API call and causing predetermined processing to be executed before and after execution of the API. For example, with regard to an API being a hooking target, a wrapper function to be called instead of the API when the API is called is defined. Then, the wrapper function is implemented in such a way as to perform processing in an order of "recording of start information, execution of the API, and recording of end information." By defining such a wrapper function, when an API is called, a wrapper function relating thereto is executed, and therefore information is recorded in an order of "start information, an event history 12 representing each event caused by execution of the API, and end information."

By executing, on the test system, an application or an OS calling an API to be included in the dictionary data 30, an operator of the test system records an event caused by execution of the API. Processing executed by the same API may vary with an execution condition. Therefore, it is preferable to execute the same API under various execution conditions and record an event under each execution condition in the test system. Then, for example, various applications calling the target API (such as an application bundled with an OS and an application normally used in an organization in which the target system is installed) are executed a plurality of times, and events are recorded. When an application or an OS has a plurality of versions, it is preferable to execute the application or the OS in various versions.

The second information processing apparatus 3000 generates dictionary data 30 including a series of events recorded between start information and end information as a second event sequence. For example, it is assumed that "start information, an event history 12 of each event caused by execution of an API, and end information" are recorded into a log file in this order, as described above. In this case, the second information processing apparatus 3000 determines a pair of start information and end information by analyzing the log file. Then, the second information processing apparatus 3000 generates dictionary data 30 with an event sequence represented by a plurality of event histories 12 recorded between the start information and the end information in the determined pair as a second event sequence and information about an API indicated in the start information as an alternative representation 20. For example, the alternative representation 20 is represented by an identification information of the API and an execution condition of the API that are indicated in the start information.

When a plurality of operation subjects operate in a target system, events caused by operations of various operation subjects may be stored in a log file in an interleaved state. Then, each piece of information output to a log file indicates an operation subject of an event. For example, an event history 12 is set to include subject information indicating an operation subject. Further, start information is also set to include subject information (such as a process ID or a thread ID) corresponding to subject information of an event history 12. When determining a pair of start information and end information, the second information processing apparatus 3000 extracts an event history 12 indicating subject information matching subject information indicated by the start information out of event histories 12 recorded between the start information and the end information. Then, the extracted event history 12 is determined as an event caused by execution of an API determined by the start information and the end information.

While the example embodiments of the present invention have been described with reference to the drawings, the embodiments are illustrations of the present invention, and combinations of the aforementioned example embodiments or various configurations other than the above may also be employed.

A part or the whole of the aforementioned example embodiments may also be described as the following supplementary notes but is not limited thereto.

1. An information processing apparatus including:
    a determination unit determining an alternative representation of an event sequence represented by a plurality of event histories, by use of dictionary data; and
    an output unit outputting information including the determined alternative representation, wherein
    the dictionary data indicate an event sequence and an alternative representation relating to the event sequence in association with each other.

2. The information processing apparatus according to 1, wherein
    the determination unit extracts one or more partial event sequences matching any event sequence indicated in the dictionary data from an event sequence including the event history of each event caused by an operation of an identical operation subject and determines an alternative representation relating to an event sequence in the dictionary data matching the partial event sequence as an alternative representation relating to the partial event sequence.

3. The information processing apparatus according to 2, wherein the determination unit acquires an event history sequence indicating a plurality of event histories and classifies the plurality of event histories included in the event history sequence into a group for each operation subject of an event and, for the each group, extracts a partial event sequence matching any event sequence indicated in the dictionary data from an event sequence including a plurality of event histories included in the group.

4. The information processing apparatus according to 2 or 3, wherein, with regard to an event sequence including a plurality of event histories, the output unit generates an event sequence by replacing the each partial event sequence extracted from the event sequence with the alternative representation matching the partial event sequence and outputs information representing the generated event sequence.

5. The information processing apparatus according to any one of 1 to 4, wherein the alternative representation indicated by the dictionary data includes identification information of a function, and the event sequence indicated by the dictionary data indicates a sequence of an event caused by execution of the function determined by the associated identification information.

6. The information processing apparatus according to 5, wherein the function is an application programming interface (API).

7. A control method executed by a computer, the control method including:

a determination step of determining an alternative representation of an event sequence represented by a plurality of event histories, by use of dictionary data; and an output step of outputting information including the determined alternative representation, wherein the dictionary data indicate an event sequence and an alternative representation relating to the event sequence in association with each other.

8. The control method according to 7, wherein, in the determination step, one or more partial event sequences matching any event sequence indicated in the dictionary data are extracted from an event sequence including the event history of each event caused by an operation of an identical operation subject, and an alternative representation relating to an event sequence in the dictionary data matching the partial event sequence is determined as an alternative representation relating to the partial event sequence.

9. The control method according to 8, wherein, in the determination step, an event history sequence indicating a plurality of event histories are acquired, and the plurality of event histories included in the event history sequence are classified into a group for each operation subject of an event, and, for the each group, a partial event sequence matching any event sequence indicated in the dictionary data is extracted from an event sequence including a plurality of event histories included in the group.

10. The control method according to 8 or 9, wherein, in the output step, with regard to an event sequence including a plurality of event histories, an event sequence is generated by replacing the each partial event sequence extracted from the event sequence with the alternative representation matching the partial event sequence, and information representing the generated event sequence is output.

11. The control method according to any one of 7 to 10, wherein the alternative representation indicated by the dictionary data includes identification information of a function, and the event sequence indicated by the dictionary data indicates a sequence of an event caused by execution of the function determined by the associated identification information.

12. The control method according to 11, wherein the function is an application programming interface (API).

13. A program causing a computer to execute each step in the control method according to any one of 7 to 12.

What is claimed is:

1. An information processing apparatus comprising:
at least one memory configured to store instructions; and
at least one processor configured to execute the instructions to perform operations, the operations comprising:
determining an alternative representation of an event sequence represented by a plurality of event histories, by use of dictionary data; and
outputting information including the determined alternative representation, wherein
the dictionary data indicate the event sequence and the alternative representation relating to the event sequence in association with each other,
the alternative representation indicated by the dictionary data includes identification information of a function, and
the event sequence indicated by the dictionary data indicates a sequence of an event caused by execution of the function determined by the associated identification information.

2. The information processing apparatus according to claim 1, wherein
the operations further comprise:
extracting one or more partial event sequences matching any event sequence indicated in the dictionary data from the event sequence including the event history of each event caused by an operation of an identical operation subject and
determining the alternative representation relating to the event sequence in the dictionary data matching the partial event sequence as the alternative representation relating to the partial event sequence.

3. The information processing apparatus according to claim 2, wherein
the operations further comprise:

acquiring an event history sequence indicating the plurality of event histories and classifies the plurality of event histories included in the event history sequence into a group for each operation subject of an event and, for the each group, extracting a partial event sequence matching any event sequence indicated in the dictionary data from the event sequence including the plurality of event histories included in the group.

4. The information processing apparatus according to claim 2, wherein the operations further comprise:

with regard to the event sequence including the plurality of event histories, generating the event sequence by replacing the each partial event sequence extracted from the event sequence with the alternative representation matching the partial event sequence and outputting information representing the generated event sequence.

5. The information processing apparatus according to claim 1, wherein the function is an application programming interface (API).

6. A control method executed by a computer, the control method comprising:

a determination step of determining an alternative representation of an event sequence represented by a plurality of event histories, by use of dictionary data; and an output step of outputting information including the determined alternative representation, wherein the dictionary data indicate the event sequence and the alternative representation relating to the event sequence in association with each other, the alternative representation indicated by the dictionary data includes identification information of a function, and the event sequence indicated by the dictionary data indicates a sequence of an event caused by execution of the function determined by the associated identification information.

7. The control method according to claim 6, wherein, in the determination step, one or more partial event sequences matching any event sequence indicated in the dictionary data are extracted from the event sequence including the event history of each event caused by an operation of an identical operation subject, and the alternative representation relating to the event sequence in the dictionary data matching the partial event sequence is determined as the alternative representation relating to the partial event sequence.

8. The control method according to claim 7, wherein, in the determination step, an event history sequence indicating the plurality of event histories are acquired, and the plurality of event histories included in the event history sequence are classified into a group for each operation subject of an event, and, for the each group, a partial event sequence matching any event sequence indicated in the dictionary data is extracted from the event sequence including the plurality of event histories included in the group.

9. The control method according to claim 7, wherein, in the output step, with regard to the event sequence including the plurality of event histories, the event sequence is generated by replacing the each partial event sequence extracted from the event sequence with the alternative representation matching the partial event sequence, and information representing the generated event sequence is output.

10. The control method according to claim 6, wherein the function is an application programming interface (API).

11. A non-transitory computer readable medium storing a program causing a computer to execute each step in a control method, the method comprising:

a determination step of determining an alternative representation of an event sequence represented by a plurality of event histories, by use of dictionary data; and an output step of outputting information including the determined alternative representation, wherein the dictionary data indicate the event sequence and the alternative representation relating to the event sequence in association with each other, the alternative representation indicated by the dictionary data includes identification information of a function, and the event sequence indicated by the dictionary data indicates a sequence of an event caused by execution of the function determined by the associated identification information.

* * * * *